(12) United States Patent
Chen et al.

(10) Patent No.: US 11,891,490 B2
(45) Date of Patent: Feb. 6, 2024

(54) PROTECTIVE STARCH-BASED FILM AND ITS PREPARATION METHOD AND APPLICATION (71) Applicant: Jiangnan University, Wuxi (CN)

(72) Inventors: Long Chen, Wuxi (CN); Hao Xu, Wuxi (CN); Zhengyu Jin, Wuxi (CN); Ming Miao, Wuxi (CN); Yaoqi Tian, Wuxi (CN); Xinwen Peng, Wuxi (CN); Yidong Zou, Wuxi (CN); Guanxiong Chen, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/233,375

(22) Filed: Aug. 14, 2023

(65) Prior Publication Data

US 2023/0383075 A1 Nov. 30, 2023

Related U.S. Application Data (63) Continuation of application No. PCT/CN2023/079274, filed on Mar. 2, 2023.

(30) Foreign Application Priority Data

Jun. 28, 2022 (CN) .......................... 202210750655.5

(51) Int. Cl.
*C08J 5/18* (2006.01)
*C08L 3/02* (2006.01)
*C08K 3/22* (2006.01)
*C08K 9/04* (2006.01)

(52) U.S. Cl.
CPC ..................... *C08J 5/18* (2013.01); *C08K 3/22* (2013.01); *C08K 9/04* (2013.01); *C08L 3/02* (2013.01); *C08J 2303/02* (2013.01); *C08K 2003/2296* (2013.01); *C08K 2201/011* (2013.01); *C08K 2201/018* (2013.01)

(58) Field of Classification Search
None
See application file for complete search history.

(56) References Cited

U.S. PATENT DOCUMENTS

2012/0205590 A1 8/2012 Lee et al.

FOREIGN PATENT DOCUMENTS

| | | | |
|---|---|---|---|
| CN | 111978572 | A | 11/2020 |
| CN | 112280067 | A | 1/2021 |
| CN | 113827771 | A | 12/2021 |
| CN | 115093614 | A | 9/2022 |

*Primary Examiner* — Robert T Butcher (74) *Attorney, Agent, or Firm* — IPRO, PLLC; Na Xu (57) ABSTRACT Disclosed are a protective starch-based film and its preparation method and application, belonging to the field of food packaging. According to the method for preparing the protective starch-based film, surfaces of zinc oxide nanoparticles are enabled to adsorb tannic acid and iron ions under the action of metal coordination by controlling the pH to obtain metallic polyphenol network coated zinc oxide nanoparticles, dispersion of the obtained nanoparticles is added to a starch gelatinization solution, and a melanin-like precursor is simultaneously added to form mixed liquid; and by controlling the pH of the mixed solution, π-π stacking, self-polymerization and metal coordination are induced, so that a stable protective starch-based film with a nano-reinforced interpenetrating network structure is formed. The method is simple, green, pollution-free and energy-saving, and the prepared starch-based degradable film has remarkable ultraviolet-shielding, mechanical and antibacterial properties, thus having wide application prospects in the field of food packaging.

8 Claims, 3 Drawing Sheets

PROTECTIVE STARCH-BASED FILM AND ITS PREPARATION METHOD AND APPLICATION

TECHNICAL FIELD

The present disclosure relates to a protective starch-based film and its preparation method and application, belonging to the field of food packaging.

BACKGROUND

Microbial contamination and long-term exposure to radiation are important causes of food spoilage and oxidative loss of nutrients. Active packaging is a novel packaging material, which can actively interact with the internal and external environment of food packaging to minimize the growth of microorganisms and control the oxidation rate of food, thus ultimately achieving the purpose of extending food shelf life and maintaining food quality.

In order to prepare such active packaging, substances that have antibacterial activity or can absorb ultraviolet rays are often simply mixed with the conventional packaging materials to obtain the active packaging. However, the existing active packaging is generally expensive, cannot be completely degraded, has poor mechanical properties and is single in function, making it unable to combine antibacterial and ultraviolet shielding characteristics.

In practical applications, the protection of photosensitive foods involves redundant steps such as adding sterilization steps or dark box storage, which increases the cost of food storage, transportation, and sales. Moreover, most antibacterial packaging has limited actual antibacterial property and thus cannot achieve an effect of long-term bacteriostasis. Most ultraviolet shielding packaging achieves the effect of shielding ultraviolet rays by adding a black dye, which makes such packaging almost opaque and affects appearance, and the food inside the packaging is prone to growth of spoilage bacteria.

Therefore, it is urgent to develop a natural biodegradable active packaging film with dual functions of long-term bacteriostasis and ultraviolet shielding and a preparation method therefor, which has important economic value and social significance for extending food shelf life and solving food safety and quality problems.

SUMMARY

The purpose of the present disclosure is to solve the technical problem that the existing active packaging film is poor in biodegradability and mechanical properties, and thus cannot have dual functions of long-term bacteriostasis and ultraviolet shielding.

To this end, the present disclosure provides a protective starch-based film and its preparation method and application, which uses a method implemented by self-assembly of nanoparticles and self-polymerization of a melanin-like precursor to prepare a degradable active packaging starch-based film with excellent antibacterial, ultraviolet-shielding and mechanical properties. The method is simple, green, pollution-free, and energy-saving. Compared with the comparative examples, the antibacterial rate of the starch-based film can be increased by 67%, while the ultraviolet shielding effect thereof is close to 100%, and the starch-based film has a certain degree of transparency and mechanical properties.

The first objective of the present disclosure is to provide a method for preparing a protective starch-based film, which includes the following steps:

(1) preparation of metallic polyphenol network coated zinc oxide nanoparticles:

dispersing zinc oxide nanoparticles uniformly in water, adding a tannic acid solution and a hydrated ferric chloride solution separately, shaking for mixing, and adjusting the pH; shaking again for mixing to form a mixture of metallic polyphenol network coated zinc oxide nanoparticles; and washing and freeze-drying the mixture to obtain the metallic polyphenol network coated zinc oxide nanoparticles;

(2) dispersing the metallic polyphenol network coated zinc oxide nanoparticles obtained in step (1) in water, and carrying out ultrasonic treatment to form dispersion;

(3) dissolving starch in an aqueous solution, heating to gelatinize, and then stirring and cooling to form a starch gelatinization solution;

(4) mixing a melanin-like precursor with the dispersion obtained in step (2) and the starch gelatinization solution obtained in step (3), stirring evenly, and adjusting the pH; and then, stirring under the condition of blowing oxygen or air for self-polymerization so as to obtain a polymer solution, where the melanin-like precursor is one or more of 5S cysteine dopamine, 5, 6-dihydroxyindole, catecholamine, and dopamine; and (5) pouring the polymer solution obtained in step (4) into a polytetrafluoroethylene plate by using a tape casting method, drying the plate in an oven to form a film, and then peeling off the film and perform humidity balancing on same to obtain the protective starch-based film.

In an embodiment of the present disclosure, the diameters of the zinc oxide nanoparticles described in step (1) is 30-90 nm.

In an embodiment of the present disclosure, in step (1), a mass ratio of tannic acid to hydrated ferric chloride is 1:(1-10), and a mass ratio of the tannic acid to the zinc oxide nanoparticles is 1:80 to 1:120.

In an embodiment of the present disclosure, the pH value is adjusted to 7.5-10 in step (1).

In an embodiment of the present disclosure, the shaking for mixing described in step (1) is carried out for 10-30 s.

In an embodiment of the present disclosure, the washing process described in step (1) involves centrifuging the mixture of the metallic polyphenol network coated zinc oxide nanoparticles to remove supernatant so as to obtain precipitate of the mixture; then, adding deionized water with pH adjusted to 7.5-10 in advance to the obtained precipitate of the mixture, shaking for mixing evenly, and centrifuging again to remove the supernatant; and the washing step is repeated 3 times to obtain the metallic polyphenol network coated zinc oxide nanoparticle product.

In an embodiment of the present disclosure, the heating to gelatinize described in step (3) is carried out at 80-150° C. for 10-30 min.

In an embodiment of the present disclosure, the cooling described in step (3) is to cool the starch gelatinized by heating to a temperature of 40-55° C.

In an embodiment of the present disclosure, in step (4), a mass ratio of the metallic polyphenol network coated nanoparticles to the starch is (0.025-1):1, and a mass ratio of the melanin-like precursor to the starch is (0.25-1):1.

In an embodiment of the present disclosure, the pH value is adjusted to 8-9 in step (4).

In an embodiment of the present disclosure, the self-polymerization described in step (4) is carried out at a stirring rate of 600-800 rpm for 10-30 min.

In an embodiment of the present disclosure, the mixture needs to be degassed before the casting described in step (5), and the degassing method includes vacuum ultrasonic degassing or ultrasonic degassing.

In an embodiment of the present disclosure, in step (5), a drying temperature is 30-55° C., and the drying time is 6-24 h.

In an embodiment of the present disclosure, the balancing described in step (5) is performed under the conditions of a temperature of 20-35° C., a relative humidity of 50-80% RH, and the balancing time of 12-48 h.

The second objective of the present disclosure is to provide a protective starch-based film prepared by the above-mentioned method.

The third objective of the present disclosure is to provide a packaging material, a wearable material and a degradable material, which include the above-mentioned protective starch-based film.

The fourth objective of the present disclosure is to provide applications of the above-mentioned protective starch-based film in the fields of food, medicine, agricultural products, or textiles.

BENEFICIAL EFFECTS OF THE PRESENT DISCLOSURE

According to the present disclosure, based on the synergistic effect of self-polymerization and metallic polyphenol coordination, starch molecules, polydopamine and metallic polyphenol modified nano-zinc oxide are induced to form a stable nano-reinforced interpenetrating network structure interleaved with soft-rigid-soft structures by means of π-π stacking, hydrogen-bond interaction and metal coordination, thereby improving the ultraviolet-shielding and mechanical properties of the film material. Furthermore, metallic polyphenol cooperates with zinc oxide to release more oxidizing metal ions, so that the film material is enabled to have more excellent antibacterial property. The prepared active packaging film is complete and continuous, with reliable mechanical properties, has an ultraviolet shielding effect close to 100%, and has a certain degree of transparency. In addition, the antibacterial property of the film against *Staphylococcus aureus* reaches 16.8-22.6 mm, which can effectively inhibit the growth of food spoilage bacteria in packaging, thus extending food shelf life and maintaining food safety and quality.

DETAILED DESCRIPTION

The present disclosure will be further described below with reference to the following examples, but embodiments of the present disclosure are not limited thereto.

1. Mechanical Property Test: The Tensile Strength and Elongation at Break of a Protective Starch-Based Film were Evaluated by Using a TA Texture Analyzer and Setting a Film Stretching Method.

The specific test method was as follows: firstly, a film sample was placed in a constant temperature and humidity environment for 24 h, with a humidity being 53% and a temperature being 25° C. Then, the film sample was cut into a long strip diaphragm with a length of 80 mm and a width of 15 mm, an A/TG film stretching fixture was selected, a stretching test speed was set to 100 mm/min, and a gauge length was set to 40 mm. Finally, the long strip diaphragm was fixed on the A/TG film stretching fixture, and the tensile strength and elongation at break of the long strip diaphragm were measured and recorded.

The tensile strength was calculated according to the following formula:

$$\sigma_t = p/(bd)$$

where: p denotes maximum load, breaking load, N; b denotes sample width, mm; d denotes sample thickness, mm; and $\sigma_t$ denotes tensile strength, MPa.

The elongation at break was calculated according to the following formula:

$$\varepsilon_t = 100(L_1 - L_0)/L_0$$

where: $L_1$ denotes gauge length of sample at break, mm; $L_0$ denotes original gauge length of sample, mm; and $\varepsilon_t$ elongation at break, %.

2. Antimicrobial Property Test: The Antimicrobial Property of a Protective Starch-Based Film was Tested by an Agar Disc Diffusion Method.

The specific steps were as follows: firstly, agar was poured into a sterilized plate to prepare an agar plate with a thickness of 4 mm. Then, a film sample was cut into a circular diaphragm with a diameter of 6 mm and sterilized for 1 h under ultraviolet rays; and agar was evenly coated with 100 μL of activated bacteria liquid. Finally, the circular diaphragm with a thickness of 6 mm was placed on the agar and incubated in a biochemical incubator at 37° C. for 24 h, and the inhibition zone diameter was observed and recorded.

3. Ultraviolet Shielding Property Test: Spectrophotometry was Used to Test the Full-Spectrum Transmittance of a Protective Starch-Based Film to Evaluate its Ultraviolet Shielding Property.

The specific operation steps were as follows: firstly, a film sample was cut into a rectangular diaphragm with a length of 35 mm and a width of 8 mm. Then, the prepared rectangular diaphragm was placed in a glass cuvette, and the cuvette was placed in an ultraviolet-visible spectrometer. The light transmittance of the diaphragm was measured within a wavelength range of 300-800 nm, with the transmittance being taken as the ordinate.

Example 1

A Method for Preparing a Protective Starch-Based Film Specifically Included the Following Steps:

(1) Preparation of zinc oxide nanoparticles coated with metal polyphenol network: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the metallic polyphenol network coated zinc oxide nanoparticle product obtained in step (2) was freeze-dried to obtain metallic polyphenol network coated zinc oxide nanoparticles.

(4) Ultrasonic dispersion: 75 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 8.5, so that a mixed solution was obtained.

(7) Self-polymerization: under the air conditions, the mixed solution obtained in step (6) was self-polymerized at a stirring rate of 600 rpm for 30 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

Figure 1:
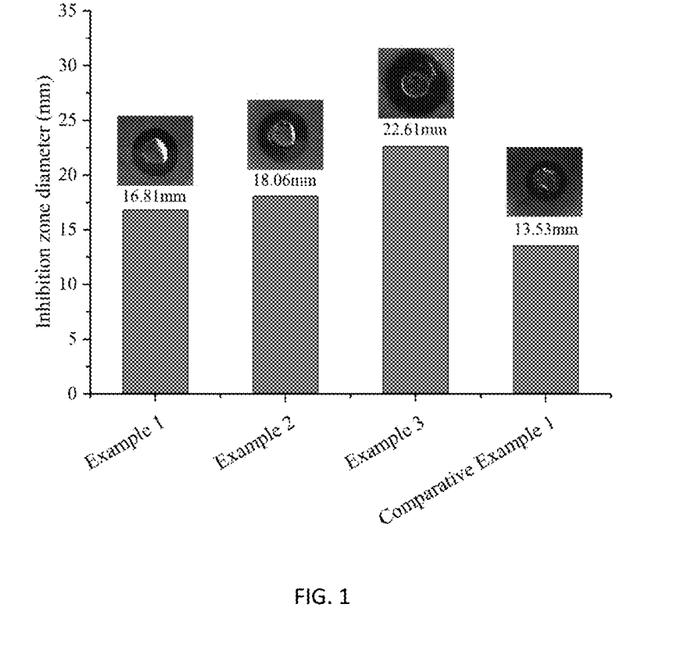
FIG. 1 shows antimicrobial properties of protective starch-based films prepared in Examples 1-3 and Comparative Example 1 of the present disclosure.

The antimicrobial property of the protective starch-based film with ultraviolet-resistant performance and antibacterial activity prepared in Example 1 is shown in FIG. 1. It can be observed that the inhibition zone diameter of the film against *S. aureus* is 16.81 mm, which proves that the film has a significant antibacterial effect on the *S. aureus*.

Figure 2:
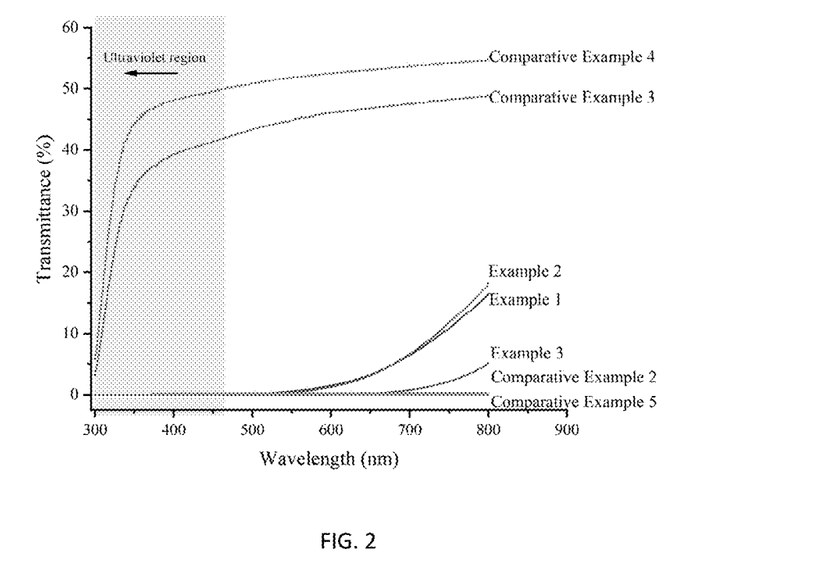
FIG. 2 shows ultraviolet shielding properties of protective starch-based films prepared in Examples 1-3 and Comparative Examples 2-5 of the present disclosure.

The ultraviolet shielding ability of the protective starch-based film prepared in this Example is shown in FIG. 2. It can be observed that the transmittance of the film to ultraviolet rays is almost 0, which proves that the film has excellent ultraviolet shielding ability.

Figure 3:
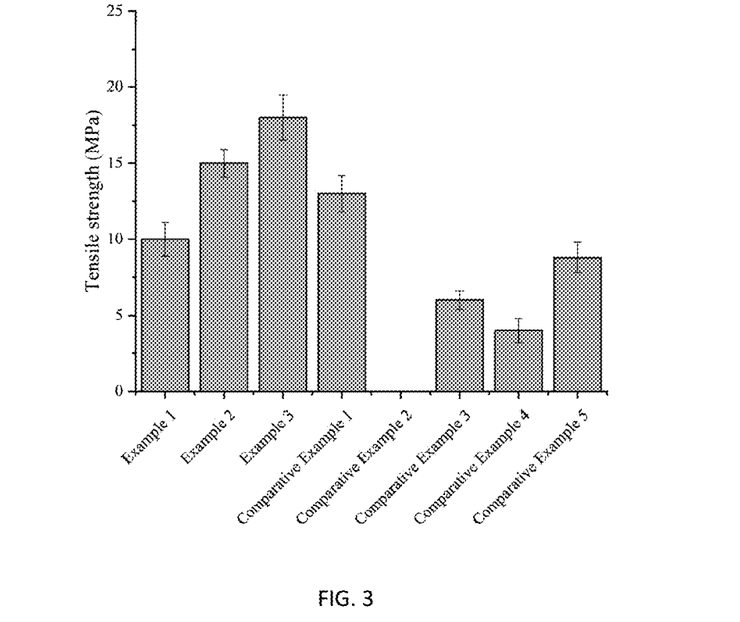
FIG. 3 shows tensile strengths of protective starch-based films prepared in Examples 1-3 and Comparative Examples 1-5 of the present disclosure.
Figure 4:
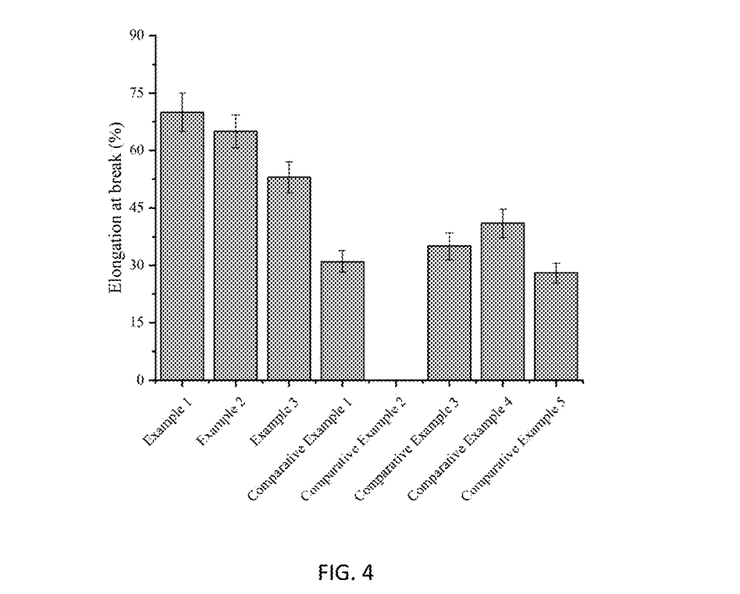
FIG. 4 shows elongations at break of protective starch-based films prepared in Examples 1-3 and Comparative Examples 1-5 of the present disclosure.

The tensile strength and elongation at break of the protective starch-based film prepared in this Example are shown in FIG. 3 and FIG. 4. It can be observed that the film has a tensile strength of 10.1 MPa and an elongation at break of 69.5%, which proves that the film has reliable mechanical properties.

The microstructure of the coated nanoparticles in the protective starch-based film with ultraviolet-resistant performance and antibacterial activity prepared in this Example is shown in FIG. 4. It can be observed that a metallic polyphenol network is successfully deposited on surfaces of the zinc oxide nanoparticles.

Figure 5:
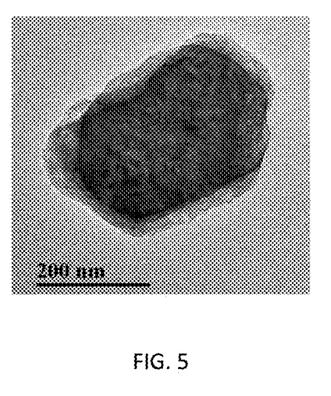
FIG. 5 is a transmission electron microscopy diagram of metallic polyphenol network coated zinc oxide nanoparticles in a protective starch-based film prepared by the present disclosure.

The protective starch-based film with ultraviolet-resistant performance and antibacterial activity prepared in this Example is shown in FIG. 5. The film is brownish-black, which indirectly proves that the dopamine is successfully self-polymerized so as to form a melanin-like structure.

Example 2

(1) Preparation of zinc oxide nanoparticles coated with metal polyphenol network: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the metallic polyphenol network coated zinc oxide nanoparticle product obtained in step (2) was freeze-dried to obtain metallic polyphenol network coated zinc oxide nanoparticles.

(4) Ultrasonic dispersion: 150 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 8.5, so that a mixed solution was obtained.

(7) Self-polymerization: under the air conditions, the mixture obtained in step (6) was self-polymerized at a stirring rate of 600 rpm for 30 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The antimicrobial property of the protective starch-based film prepared in this Example is shown in FIG. 1. It can be observed that the inhibition zone diameter of the film against *S. aureus* is 18.06 mm, which proves that the film has a significant antibacterial effect on the *S. aureus*.

The ultraviolet shielding ability of the protective starch-based film with ultraviolet-resistant performance and antibacterial activity prepared in this Example is shown in FIG. 2. It can be observed that the transmittance of the film to ultraviolet rays is almost 0, which proves that the film has excellent ultraviolet shielding ability.

The tensile strength and elongation at break of the protective starch-based film prepared in this Example are shown in FIG. 3 and FIG. 4. It can be observed that the film has a tensile strength of 15.2 MPa and an elongation at break of 60.5%, which proves that the film has reliable mechanical properties.

Example 3

(1) Preparation of zinc oxide nanoparticles coated with metal polyphenol network: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the product obtained in step (2) was freeze-dried to obtain metallic polyphenol network coated zinc oxide nanoparticles.

(4) Ultrasonic dispersion: 300 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 8.5, so that a mixed solution was obtained.

(7) Self-polymerization: under the air conditions, the mixture obtained in step (6) was self-polymerized at a stirring rate of 600 rpm for 30 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The antimicrobial property of the protective starch-based film prepared in this Example is shown in FIG. 1. It can be observed that the inhibition zone diameter of the film against *S. aureus* is 22.61 mm, which proves that the film has a significant antibacterial effect on the *S. aureus*.

The ultraviolet shielding ability of the protective starch-based film with ultraviolet-resistant performance and antibacterial activity prepared in this Example is shown in FIG. 2. It can be observed that the transmittance of the film to ultraviolet rays is almost 0, which proves that the film has excellent ultraviolet shielding ability.

The tensile strength and elongation at break of the protective starch-based film prepared in this Example are shown in FIG. 3 and FIG. 4. It can be observed that the film has a tensile strength of 17.5 MPa and an elongation at break of 52%, which proves that the film has reliable mechanical properties.

Comparative Example 1

(1) Ultrasonic dispersion: 150 mg of zinc oxide nanoparticles were weighed, added to 20 ml of deionized water, and ultrasonically treated for 10 min under 120 W, so that dispersion of the zinc oxide nanoparticles was obtained.

(2) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(3) Uniform mixing: 0.9 g of dopamine was evenly mixed with the dispersion of the zinc oxide nanoparticles obtained in step (1) and the starch gelatinization solution obtained in step (2) at 40° C., and the pH was adjusted to 8.5, so that a mixed solution was obtained.

(4) Self-polymerization: under the air conditions, the mixture obtained in step (3) was self-polymerized at a stirring rate of 600 rpm for 30 min to obtain a polymer solution.

(5) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The antimicrobial property of the protective starch-based film prepared in this Comparative Example is shown in FIG. 1. It can be observed that the inhibition zone diameter of the film against *S. aureus* is only 13.53 mm compared with the examples, indicating that the antibacterial property of the uncoated zinc oxide nanoparticles is not good.

The tensile strength and elongation at break of the protective starch-based film prepared in this Comparative Example are shown in FIG. 3 and FIG. 4. It can be observed that the film has a tensile strength of 13.0 MPa and an elongation at break of 56%. Compared with Example 2, both the tensile strength and elongation at break of the film have decreased, indicating that simply adding the zinc oxide nanoparticles is not conducive to improving the mechanical properties of the film.

Comparative Example 2 (the Difference Between Comparative Example 2 and Example 2 is that the Polymerization Time in Step 7 is 60 Min (1) Preparation of zinc oxide nanoparticles coated with metal polyphenol network: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the product obtained in step (2) was freeze-dried to obtain metallic polyphenol network coated zinc oxide nanoparticles.

(4) Ultrasonic dispersion: 150 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 8.5, so that a mixed solution was obtained.

(7) Self-polymerization: under the air conditions, the mixture obtained in step (6) was self-polymerized at a stirring rate of 600 rpm for 60 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The ultraviolet shielding property of the protective starch-based film prepared in this Comparative Example is shown in FIG. 2. It can be observed that although the film has a shielding effect on ultraviolet rays, it is almost opaque and lacks transparency. It is indicated that too long polymerization time is not conducive to the visible light transmittance of the film and thus affects the application scope of the film.

The tensile strength and elongation at break of the protective starch-based film prepared in this Comparative Example are shown in FIG. 3 and FIG. 4. Since the film is brittle and extremely fragile, it does not have testable conditions, which proves that the film has poor mechanical properties.

Comparative Example 3 (the Difference Between Comparative Example 3 and Example 2 is that the Polymerization Time in Step 7 is 5 Min (1) Preparation of zinc oxide nanoparticles coated with metal polyphenol network: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the product obtained in step (2) was freeze-dried to obtain metallic polyphenol network coated zinc oxide nanoparticles.

(4) Ultrasonic dispersion: 150 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 8.5, so that a mixed solution was obtained.

(7) Self-polymerization: under the air conditions, the mixture obtained in step (6) was self-polymerized at a stirring rate of 600 rpm for 5 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The ultraviolet shielding property of the protective starch-based film prepared in this Comparative Example is shown in FIG. 2. It can be observed that the film has almost no shielding effect on ultraviolet rays. It is indicated that too short polymerization time is not conducive to the ultraviolet shielding effect of the protective starch-based film.

The tensile strength and elongation at break of the protective starch-based film prepared in this Comparative Example are shown in FIG. 3 and FIG. 4. It can be observed that the tensile strength of the film is only 6.1 MPa, and the elongation at break is only 35.2%. Compared with the examples, the tensile strength and elongation at break of the film have significantly decreased, indicating that the mechanical properties of the film are poorer.

Comparative Example 4 (the Difference Between Comparative Example 4 and Example 2 is that the pH is Adjusted to 6 in Step 6

(1) Metallic polyphenol network coated zinc oxide nanoparticles: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the product obtained in step (2) was freeze-dried to obtain metallic polyphenol network coated zinc oxide nanoparticles.

(4) Ultrasonic dispersion: 150 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 6, so that a mixed solution was obtained.

(7) Self-polymerization: under the air conditions, the mixture obtained in step (6) was self-polymerized at a stirring rate of 600 rpm for 30 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The ultraviolet shielding property of the protective starch-based film prepared in this Comparative Example is shown in FIG. 2. It can be observed that the film has almost no shielding effect on ultraviolet rays. It is indicated that under the condition that the pH is 6, no polymerization occurs, which is not conducive to the formation of the ultraviolet shielding property of the protective starch-based film.

The tensile strength and elongation at break of the protective starch-based film prepared in this Comparative Example are shown in FIG. 3 and FIG. 4. It can be observed that the tensile strength of the film is only 4 MPa, and the elongation at break is only 40.5%. Compared with the examples, the tensile strength and elongation at break of the film have significantly decreased, indicating that the mechanical properties of the film are poorer.

Comparative Example 5 (the Difference Between Comparative Example 5 and Example 2 is that the pH is Adjusted to 10 in Step 6

(1) Metallic polyphenol network coated zinc oxide nanoparticles: 0.5 g of zinc oxide nanoparticles with particle sizes of 30 nm was weighed and evenly dispersed in 49 ml of deionized water. 0.5 ml of a tannic acid solution with a concentration of 10 mg/mL was added, and the obtained mixed solution was shaken so as to be mixed well. Then 0.5 ml of a hydrated ferric chloride solution with a concentration of 24 mg/mL was then added, the pH was immediately adjusted to 8.0, and the mixed solution was shaken again for mixing, so that a mixture of the metallic polyphenol network coated zinc oxide nanoparticles was formed.

(2) Washing: the mixture of the metallic polyphenol network coated zinc oxide nanoparticles obtained in step (1) was centrifuged to remove supernatant so as to obtain precipitate of the mixture. Then, deionized water with pH adjusted to 8.0 in advance was added to the obtained precipitate of the mixture, the obtained mixed solution was shaken so as to be mixed well, and the product was centrifuged again to remove the supernatant. The washing step was repeated 3 times to obtain the metallic polyphenol network coated zinc oxide nanoparticle product.

(3) Freeze-drying: the product obtained in step (2) was freeze-dried to obtain metallic polyphenol network coated zinc oxide nanoparticles.

(4) Ultrasonic dispersion: 150 mg of the metallic polyphenol network coated zinc oxide nanoparticles obtained in step (3) were weighed, added to 20 ml of deionized water, and ultrasonically treated for 10 min under 120 W, so that dispersion of the metallic polyphenol network coated zinc oxide nanoparticles was obtained.

(5) Gelatinization: 3 g of starch was weighed, placed in 80 ml of an aqueous solution, and gelatinized at 90° C. for 10 min. Then, the product was stirred and cooled to 40° C. to obtain a starch gelatinization solution.

(6) Uniform mixing: 0.9 g of dopamine was evenly mixed with the dispersion of the metallic polyphenol network coated zinc oxide nanoparticles obtained in step (4) and the starch gelatinization solution obtained in step (5) at 40° C., and the pH was adjusted to 10, so that a mixed solution was obtained.

(7) Self-polymerization: under the air conditions, the mixture obtained in step (6) was self-polymerized at a stirring rate of 600 rpm for 30 min to obtain a polymer solution.

(8) Film preparation: the polymer solution obtained in step (7) was poured into a polytetrafluoroethylene plate, the plate was placed in an oven at 40° C. and dried for 6 h to form a film, and the film was then peeled off and balanced for 24 h at a humidity of 53%, so that a UV-resistant and antibacterial protective starch-based film was obtained.

The ultraviolet shielding property of the protective starch-based film prepared in this Comparative Example is shown in FIG. 2. It can be observed that although the film has a shielding effect on ultraviolet rays, it is almost opaque and lacks transparency. It is indicated that when the pH is 10, it is not conducive to the visible light transmittance of the film and thus affects the application scope of the film.

The tensile strength and elongation at break of the protective starch-based film prepared in this Comparative Example are shown in FIG. 3 and FIG. 4. It can be observed that the tensile strength of the film is only 7.9 MPa, and the elongation at break is only 25.3%. Compared with the examples, the tensile strength of the film has decreased, and the elongation at break of the film has significantly decreased, indicating that the flexibility of the film is poor.

Although the present disclosure has been disclosed as above in exemplary examples, it is not intended to limit the present disclosure. Anyone familiar with this technology can make various changes and modifications without departing from the spirit and scope of the present disclosure. Therefore, the protection scope of the present disclosure shall be as defined in the Claims.

What is claimed is:

1. A method for preparing a protective starch-based film, comprising the following steps:
   (1) preparation of metallic polyphenol network coated zinc oxide nanoparticles:
      dispersing zinc oxide nanoparticles uniformly in water, adding a tannic acid solution and a hydrated ferric chloride solution separately, shaking for mixing, and adjusting the pH; shaking again for mixing to form a mixture of metallic polyphenol network coated zinc oxide nanoparticles; and washing and freeze-drying the mixture to obtain the metallic polyphenol network coated zinc oxide nanoparticles;
   (2) dispersing the metallic polyphenol network coated zinc oxide nanoparticles obtained in step (1) in water, and carrying out ultrasonic treatment to form a dispersion;
   (3) dissolving starch in an aqueous solution, heating to gelatinize, and then stirring and cooling to form a starch gelatinization solution;
   (4) mixing a melanin-like precursor with the dispersion obtained in step (2) and the starch gelatinization solution obtained in step (3), stirring evenly, and adjusting the pH; and then, stirring under the condition of blowing oxygen or air for self-polymerization so as to obtain a polymer solution, wherein
   the melanin-like precursor is one or more of 5S cysteine dopamine, 5, 6-dihydroxyindole, catecholamine, and dopamine; and
   (5) pouring the polymer solution obtained in step (4) into a polytetrafluoroethylene plate by using a tape casting method, drying the plate in an oven to form a film, and then peeling off the film and perform humidity balancing on same to obtain the protective starch-based film.

2. The method according to claim 1, wherein in step (1), a mass ratio of tannic acid to hydrated ferric chloride is 1:(1-10), and a mass ratio of the tannic acid to the zinc oxide nanoparticles is 1:80 to 1:120.

3. The method according to claim 1, wherein the pH value is adjusted to 7.5-10 in step (1).

4. The method according to claim 1, wherein the heating to gelatinize in step (3) is carried out at 80-150° C. for 10-30 minutes.

5. The method according to claim 1, wherein in step (4), a mass ratio of the metallic polyphenol network coated nanoparticles to the starch is (0.025-1):1, and a mass ratio of the melanin-like precursor to the starch is (0.25-1):1.

6. The method according to claim 1, wherein the self-polymerization in step (4) is carried out at a stirring rate of 600-800 rpm for 10-30 minutes.

7. The method according to claim 1, wherein the pH value is adjusted to 8-9 in step (4).

8. A protective starch-based film, prepared by the method according to claim 1.

* * * * *